July 23, 1940.  J. H. FAGG  2,209,155

TRANSMISSION MECHANISM

Filed Dec. 11, 1937

INVENTOR.
John H. Fagg
BY Joseph B. Gardner
ATTORNEY.

Patented July 23, 1940

2,209,155

UNITED STATES PATENT OFFICE 2,209,155

TRANSMISSION MECHANISM

John H. Fagg, Chico, Calif.

Application December 11, 1937, Serial No. 179,349

2 Claims. (Cl. 192—150)

The invention relates to a transmission mechanism adapted for interpositioning between a source of power and an operating mechanism and which is effective to limit the amount of power and driving force transmitted to said mechanism, to prevent overloading of the same.

An object of the invention is to provide a transmission mechanism of the character described which will automatically limit the driving force or torque transmitted to connected power driven equipment so as to prevent an overloading of such equipment. In accordance with the present arrangement the transmission mechanism operates to disconnect drive and driven parts in the transmission line between the source of power and the power driven equipment upon a force or torque differential between said members being established above a predetermined amount and operates automatically to re-establish a driving connection between said parts upon a reduction of such force or torque differential to within a safe working load for the equipment.

Another object of the invention is to provide an automatic overload release mechanism of the character described, which while causing a partial disconnection of the power driven equipment from the source of power upon an overloading of the equipment, will nevertheless apply a constant maximum driving torque to the equipment to prevent a complete release of the load carried thereby.

A further object of the invention is to provide a transmission mechanism of the character described which will transmit power in either direction through the mechanism and will also afford the desirable overload release characteristics above when transmitting power in either direction.

Still another object of the invention is to provide a transmission mechanism of the character above which will afford the automatic operation of a control means for the source of driving power to automatically reduce or shut off the power supply upon an overloading of the power driven equipment connected to the mechanism.

The invention possesses other objects and features of advantage, some of which, with the foregoing, will be set forth in the following description of the preferred form of the invention which is illustrated in the drawings accompanying and froming part of the specification. It is to be understood, however, that variations in the showing made by the said drawing and description may be adopted within the scope of the invention as set forth in the claims.

Referring to said drawing.

Figure 1:
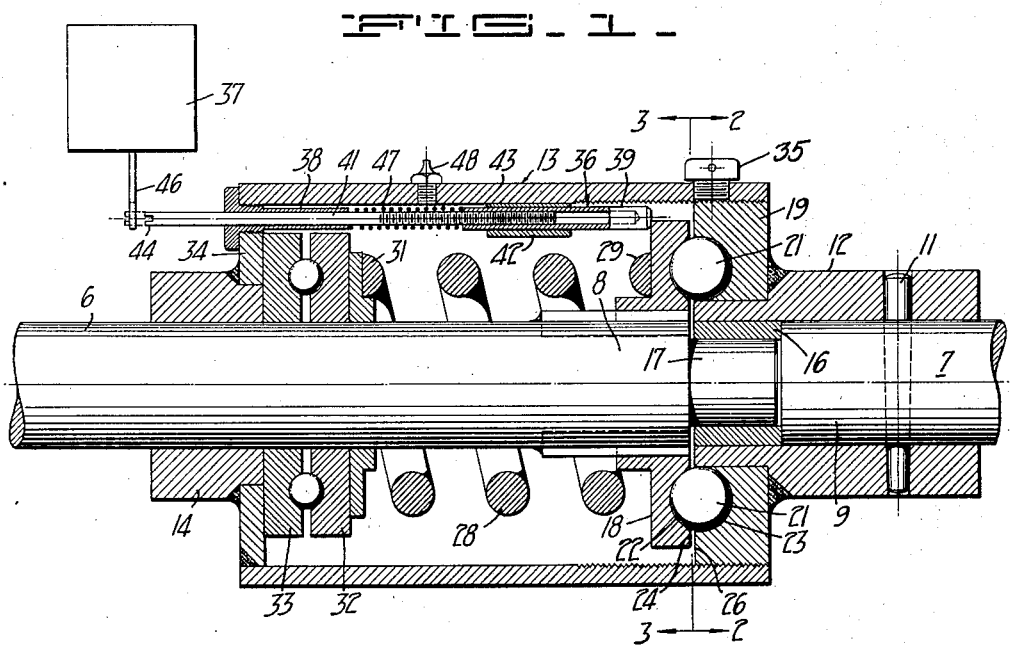
Figure 1 is a longitudinal sectional view of a transmission mechanism constructed in accordance with the present invention.
Figures 2, 3:
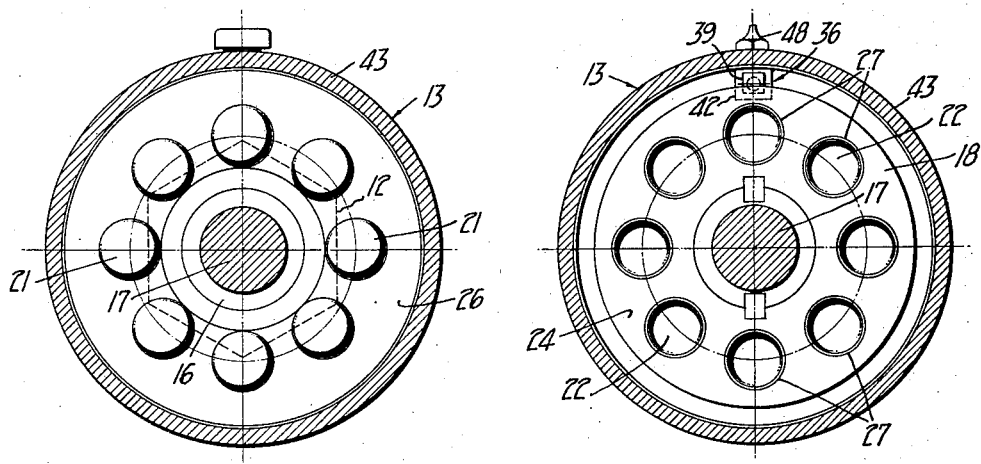
Figure 2 is a transverse sectional view of the mechanism illustrated in Figure 1 and is taken substantially on the plane of line 2—2 of Figure 1.
Figure 3 is a transverse sectional view similar to Figure 2 but viewed in an opposite longitudinal direction as indicated by the line 3—3 of Figure 1.

The transmission mechanism of the present invention and as illustrated in the accompanying drawing, comprises briefly, drive and driven parts which are arranged for connection to a source of power, such as an engine or the like, and power driven equipment respectively, and is operative to transmit from the engine to the equipment up to a predetermined amount of torque and to release the driven port upon overloading of the equipment so that only this predetermined amount of torque may be transmitted to the equipment. This automatic overload releasing feature of the transmission mechanism is carried out by a means of connection means between the drive and driven parts which is responsive to the driving force differential between these parts to cause a separation and disconnection thereof, and means for urging such parts together against separation.

With reference more specifically to the accompanying drawing, the present device is particularly designed for use with drive and driven shafts 6 and 7 which are arranged in coaxial relation with ends 8 and 9 of the shafts in adjacent opposed position. Fixed to the shaft 7 at the end 9 as by means of a pin 11 is a hub portion 12 of a cylindrical casing 13 which extends longitudinally from the shaft end 9 into surrounding relation over the shaft end 8 and is journaled at an opposite end or hub portion 14 on the shaft 6. A bearing sleeve 16 is mounted in the hub 12 adjacent the shaft end 9 for receipt of a reduced end portion 17 of the shaft end 8, so as to support the shafts 6 and 7 in coaxial position. Keyed to the shaft end 8 is a circular disc or plate 18 which is secured for rotation with the shaft 6 but is slidable longitudinally thereon to and from an end wall 19 of the casing 13. The plate 18 and the end wall 19 provide the drive and driven parts heretofore referred to and the operative connection between the shafts is effected between these parts.

This operating connection is obtained by the use of longitudinally inclined engaging surfaces between the members 18 and 19 so that the same is responsive to the driving force differential between these members to cause a separation and disconnection thereof upon an overloading of the driven shaft, and the driving connection is maintained for driving force differentials below such overloaded condition by a means urging these members together and resisting their separation and disconnection. In the present construction the inclined surfaces between the parts 18 and 19 is obtained by the use of a plurality of balls 21 mounted in opposed and aligned sockets 22 and 23 in the opposed surfaces 24 and 26 of the plate 18 and end wall 19 of the casing. Preferably, the sockets in each of these opposed surfaces are positioned at an equal radius from the axis of rotation of the shafts so that upon relative rotation of the plate and end wall, the balls may engage in successive sockets of these members. As here shown, the sockets 23 are of sufficient depth so as to retain the balls therein upon relative rotation of the plate and end wall, while the sockets 22 are relatively shallower so as to cause a withdrawal of the plate 18 from the balls upon relative rotation of these members. Preferably, the outer edges 27 of the sockets 22 are widened or chamfered so as to facilitate the relative displacement of the sockets 22 and the balls 21 and to remove any unduly sharp edges as might injure the balls.

The driving connection through the balls and sockets above is maintained below a predetermined critical torque by means of a helical spring 28 which is compressed at its ends 29 and 31 between the plate 18 and the opposite end 34 of the casing so as to resiliently resist a separation of the members 18 and 19. Inasmuch as one end 29 of the spring is compressed against the plate 18 and will tend to rotate with the shaft 8, it is necessary to arrange for a relative movement between the opposite spring end 31 and the casing end 34 which rotates with the shaft 7, in order to permit of a free rotational displacement between the members 18 and 19. As here shown, the end 31 of the spring is compressed against one section 32 of a bearing having an opposed section 33 mounted against the casing end wall 34.

It will now be clear that on normal operating loads, the driving connection between the shafts 6 and 7 will be maintained by the engagement of the several balls in the opposed sockets in the parts 18 and 19. Upon overloading of the equipment driven by the engine, however, the force differential between the parts 18 and 19 is sufficient to wedge the sockets 22 and the balls from their inter-engaged position against the resilience of spring 28 to enable a relative turning of the parts. Upon dislodgement of the balls and sockets 22, the relative rotation of the parts 18 and 19 will cause a realignment and engagement of the balls with the next adjacent sockets in the member 28 and if the force differential has in the meantime been reduced, the driving connection will hold in this position and if on the other hand, the overload has not been removed, the parts will continue to slip relative to each other until the torque is reduced sufficiently to enable the balls and sockets and the spring pressure to hold the parts against relative rotation. Due to the symmetry of the present device, it will be clear that the same may be utilized to transmit power in either direction through the mechanism.

Means is also provided for adjusting the amount of torque to be transmitted. Such means operates in the present embodiment by controlling the tension of spring 28. As here shown the end wall 19 is threaded into the casing 13 and may be moved to control the interior length of the casing and the spring tension dependent thereon. A set screw 35 may be used for holding the end wall and casing in adjusted position.

If desired and as here shown, the mechanism may be arranged to automatically control the power applied to the driven shaft so as to reduce or shut off the applied power upon overloading of the mechanism. This feature is carried out by the use of an operating member 36 which is positioned for engagement with the plate 18 and is motivated thereby upon separation of the plate from the end wall 19 to operate a control means 37 for the power source. This means may be in the form of an electric switch or rheostat or valve mechanism depending upon the type of motivating power used. As here shown, the member 36 is slidably carried in a bushing 38 in the end wall 34 of the casing and is composed of a pair of threaded sections 39 and 41, the former being slidably carried in a guide 42 provided on a side wall 43 of the casing 13 for longitudinal movement with the plate 18. The section 39 and the guide are preferably formed of non-circular section, such as the square section here shown, so as to prevent rotation of the section 39 in the guide. The section 41 is preferably rotatably carried by the bushing 38 and is threaded into the section 39 so as to permit of a longitudinal adjustment of the outer end 44 of the section 41 which is extended to the outside of the casing wall 34 for engagement with an operating arm 46 for the control means 37. The arm 46 is here shown arranged for movement parallel to the plane of rotation of the device and normally the operating member 36 is held in inward position against the plate 18 to space the end 44 from arm 46 by means of a spring 47 mounted on section 41 and compressed between bushing 38 and section 39. Upon an overloading of the mechanism, the separation of the parts 18 and 19 is accompanied by an outward movement of the end 44 of operating member shown in dotted lines, across the plane of movement of the arm 46 to cause an appropriate actuation of the control means for the power source. Instead of using the member 36 for operating a control means, the same could be used if desired for operating a signal brake, or other mechanism used in conjunction with the present invention.

A grease fitting 48 is preferably provided on the side wall 43 of the casing for lubricating working parts at the interior of the casing.

It will be understood that the present transmission mechanism may be used between substantially any two drive and driven members for automatically preventing an overloading of the driven member. As a specific example of its use, the mechanism has been applied in the driving connection for a truck winch used in power driven hoisting equipment on a truck. In such an arrangement a power driven engine shaft is connected by a suitable reduction gear mechanism, usually of the worm gear type, to the winch. When applying the present device to such an arrangement, I prefer to connect the device between the engine shaft and the reduction gears so that the device will be on the high speed side of the reduction gears and thus subject to less torque for a given power transmission, than were the same positioned on the opposite or slow speed side of the reduction gears. Also, where the gear reduction is sufficiently high, say in the order of thirty or forty to one, the gears are practically non-reversible so that upon overloading of the equipment and release of the driven shaft at the transmission mechanism, the support for the load will be maintained.

I claim:

1. A transmission mechanism comprising, drive and driven shafts arranged in coaxial and substantially contiguous relation with the end of one shaft in opposed relation to an end of said other shaft, a journal carried by the end of said driven shaft for engagement by said drive shaft, a casing secured to said driven shaft end and extended over and journaled on said drive shaft, a plate keyed to said last named shaft end and mounted within said casing in opposed relation to an end wall of said casing and being movable longitudinally to and from said wall, a plurality of spherical sockets formed in the opposed surfaces of said plate and wall, a plurality of balls mounted in said sockets, a spring mounted in said casing and compressed between said plate and an opposite end wall of said casing, and bearing means connecting said spring to said last named casing wall, said sockets being spaced to render the device operative upon the positioning of any socket on said plate opposite to any socket on said end wall.

2. A transmission mechanism comprising, drive and driven shafts arranged in coaxial and substantially contiguous relation with the end of one shaft in opposed relation to an end of said other shaft, a casing secured to one of said shaft ends, journals adjacent the opposite ends of said casing to rotatably carry the other shaft, a plate keyed to said last named shaft end and mounted within said casing in opposed relation to an end wall of said casing and being movable longitudinally to and from said wall, a plurality of sockets formed in the opposed surfaces of said plate and wall, a plurality of balls mounted in said sockets, a spring mounted in said casing and compressed between said plate and an opposite end wall of said casing, bearing means connecting said spring to said last named casing wall, and a slide member mounted through said last named casing wall and engageable with said plate and adapted for connection to a control means or the like for the source of power connected to said drive shaft.

JOHN H. FAGG.